US006212269B1

(12) United States Patent
Yamanaka et al.

(10) Patent No.: US 6,212,269 B1
(45) Date of Patent: Apr. 3, 2001

(54) VIRTUAL TERMINAL CONTROL DEVICE FOR SWITCHING SYSTEM

(75) Inventors: Hiromitsu Yamanaka; Tadahiro Orihara, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/673,319

(22) Filed: Jun. 28, 1996

(30) Foreign Application Priority Data

Jun. 29, 1995 (JP) ..................................... 7-164357

(51) Int. Cl.⁷ .............................. H04M 7/00; H04M 3/42; H04M 3/00
(52) U.S. Cl. .......................... 379/230; 370/524; 379/201; 379/242; 379/269
(58) Field of Search .................................. 370/522, 524; 379/201, 207, 211, 215, 229, 230, 242, 269

(56) References Cited

U.S. PATENT DOCUMENTS 5,043,881  * 8/1991 Hamazaki ....................... 379/211 X
5,317,415  * 5/1994 Kinami et al. .................... 370/522 X

FOREIGN PATENT DOCUMENTS 6-339169    12/1994 (JP) .

* cited by examiner

*Primary Examiner*—Harry S. Hong
(74) *Attorney, Agent, or Firm*—Foley & Lardner

(57) ABSTRACT

To hide a difference in call reference mode at a protocol control section from a basic call control section which provides an added service based on a plural call reference mode, a distributing section 21 of a virtual terminal control device 20 determines whether an event (signal) of a call reference correspondence from a basic call control section 10 is connectable or not to a terminal 40 via a protocol control section 30, and delivers the signal to an actual terminal processing section 22 or a virtual terminal processing section 23. In response to receipt of signals from the basic call control section, the protocol control section and the virtual terminal processing section, the actual terminal processing section determines and executes an operation per state while shifting the state, and transfers the signal to the protocol control section and the basic call control section while converting a call reference of the signal. The virtual terminal processing section determines and executes an operation depending on a state of the actual terminal processing section relative to the signal from the basic call control section which can not be processed at the protocol control section, and sends the signal to the basic call control section and the actual terminal processing section so as to cause the basic call control section to judge as if the signal is directly sent from the actual terminal.

2 Claims, 12 Drawing Sheets

VIRTUAL TERMINAL CONTROL DEVICE FOR SWITCHING SYSTEM

BACKGROUND OF THE INVENTION

The present invention relates to a virtual terminal control device for a switching system, and more specifically, to a virtual terminal control device for a switching system that hides a difference in call reference mode at a protocol control section from a basic call control section in a call processing section of the switching system. In the call processing section of the switching system, the protocol control section performs a process for each of protocols, where the number of simultaneously connectable call references differs depending on terminals to be employed. The basic call control section performs a basic call connecting process relative to the terminal and performs an added service control through a plurality of call references attendant upon the call connecting process. These control sections form a hierarchical structure and mutually send and receive signals, each of which is an event of a call reference dependence to achieve the call processing.

In the switching system, the call processing section performs the call connecting process. The added service process is of a hierarchical structure having a protocol control section performing a protocol process corresponding to a functional classification of employed terminals. Further, a basic call control section performs a basic call connecting process relative to a particular one of the terminals and further performs an added service control attendant upon the basic call connecting process. Based on the protocol, a primitive prescribed is used as an interface between the hierarchies. However, in the conventional call processing section, the function of the basic call control section and the function of the protocol control section are not clearly separated relative to a plurality of the protocol classifications. Thus, the process peculiar to the protocol also exists in the basic call control section.

In the foregoing conventional call processing section of the switching system, the basic call control section performs the process peculiar to the protocol. This raises a problem in that the basic control section must perform the process per protocol even when offering an additional service on the basic call control section. For solving this problem, a technique has been proposed where a virtual protocol control section is provided between the basic call control section and the protocol control section (see patent application Ser. No. 5-126676). The virtual protocol control section includes normalized data storing means for storing normalized data for normalizing a procedure from the protocol control section to a virtual protocol primitive as being a common primitive, normalized data managing means for recording or erasing the normalized data relative to the normalized data storing means, and normalized data selecting and executing means for normalizing the procedure from the protocol control section to the virtual protocol primitive based on the normalized data selected from the normalized data storing means. With this arrangement, the basic call control section controls the call connecting process and the added service process based on the normalized procedure from the virtual protocol control section so that the difference in procedure between the protocols can be hidden from the basic call control section.

On the other hand, the additional or added services offered by the switching system are classified as follows in view of handling the call:

(a) An added service, such as a recording service, which is realized on a single call (call reference). For example, an abbreviated dialing service in which a designated number is recorded as an abbreviated number, and making a call to the designated number is achieved by input of the abbreviated number. An absent-subscriber service in which a designated guide number is recorded due to absence of a user, and when a call is made to the user, a message is provided to a caller based on the recorded guide number.

(b) Another added service, which is realized when a multi-call (call references) is handled on the same terminal. For example, a transfer service in which a user of his busy terminal transfers his call to another number terminal. An in-communication incoming call notifying service in which an incoming call to a busy terminal is notified and switched.

Further, the terminals (and protocols) are also classified into unintelligent one capable of processing only one call and intelligent one capable of processing a multi-calls.

In the foregoing system having the virtual protocol control section between the basic call control section and the protocol control section, the number of call references relative to the same terminal in the protocol control is not normalized in the virtual protocol control section. Accordingly, in order to provide the added service in the plural call discrimination mode, the basic call control section is required to process separately depending on whether the number of processable call references at the terminal (protocol) is single or plural. Thus, it is difficult to realize all the added services without considering the protocol. Specifically, when the basic call control section is set to provide the added service in the plural call reference mode for the intelligent terminal (intelligent protocol control section), such an added service control process can not be directly applied to the unintelligent terminal (unintelligent protocol control section) in the single call reference mode, such as the analog terminal.

SUMMARY OF THE INVENTION

Therefore, an object of the present invention is to provide a virtual terminal control device in a call processing section of a switching system having a hierarchical structure of a basic call control section and a protocol control section. Upon offering an added service realized through a plurality of call references, an added service control process in the basic call control section can be rendered common regardless to types of terminals, that is, call discrimination modes (single discrimination mode/plural discrimination mode) in the protocol control section. Even an unintelligent terminal capable of controlling only one call can enjoy the intelligent added service.

According to this invention, a virtual terminal control device for a switching system is provided between a protocol control section and a basic call control section. The protocol control section performs a process for each of protocols where the number of simultaneously connectable call references differs depending on a terminal to be employed. The basic call control section performs a basic all connecting process relative to the terminal and performs an added service control through a plurality of call references attendant upon the call connecting process. The protocol control section and the basic call control section form a hierarchical structure and mutually send and receive signals, each of which is an event of a call reference dependence so as to achieve a call process in the switching system. The virtual terminal control device comprises call reference managing data, including terminal identifying data indicating that a plurality of the call references processed by the basic call control section and the protocol control section, respectively, are for the terminal. The device also includes call reference correspondence data indicative of a connectable correspondence between each of the call references processed by the basic call control section and each of the call references processed by the protocol control section based on the number of the simultaneously connectable call discriminations depending on a classification of the protocol processed by the protocol control section. Further, the device includes terminal classification data for classifying each of the call references of the basic call control section into an actual terminal call reference corresponding to the call reference of the protocol control section or into a virtual terminal call reference not corresponding thereto. The device further includes distributing means responsive to a signal from the basic call control section for referring to the call reference managing data based on the call reference of the signal to classify the signal to distribute to the actual terminal call references and to the virtual terminal call reference. The device further includes actual terminal processing means having means for determining and executing an operation per state while shifting the state in response to receipt of a signal. The actual terminal processing means, when detecting the signal of the actual terminal call reference from the basic call control section via the distributing means, looks up the call reference managing data to convert the call reference of the received signal into the corresponding call reference of the protocol control section and sends it to the protocol control section. Further, the actual terminal processing means, when receiving the signal from the protocol control section, looks up the call reference managing data to convert the call reference of the received signal into the corresponding call reference of the basic call control section and sends it to the basic call control section. The actual terminal processing means, when receiving a control inside the device, carries out a designated process and a signal sending to the basic call control section. The actual terminal processing means, when detecting a changing trigger for the call reference correspondence data and the terminal classification data in the call reference managing data, changing these data. The device further includes virtual terminal processing means for reading out a state of the actual terminal processing means in response to receipt of the signal of the virtual terminal call reference from the basic call control section via the distributing means. The virtual terminal processing means, depending on the received signal and the state of the actual terminal processing means, executes a process and a signal sending to the basic call control section and outputs the control signal designating an operation of the actual terminal processing means. The virtual terminal processing means, when detecting a changing trigger for the call reference correspondence data and the terminal classification data in the call reference managing data, change these data.

The virtual terminal control device for a switching system can further include means for converting each of the call references processed by the basic call control section and the protocol control section into an internal number for facilitating a process inside the device. Internal managing data are provided per the internal number as the call reference managing data. The internal number managing data includes a normalized subscriber's number as terminal identifying data. The distinction between the actual terminal processing means and the virtual terminal processing means is classified as terminal classification data, a state of the actual terminal processing means in case of a terminal classification being the actual terminal processing means. An internal number, where a terminal classification is the actual terminal processing means while the normalized subscriber's number being the same as that in case of the terminal classification, being the virtual terminal processing means, a call reference, as the call reference correspondence data, for sending and receiving the signals relative to the protocol control section, and a call reference, as the call reference correspondence data, for sending and receiving the signals relative to the basic call control section. Every time the actual terminal processing means changes the state, the state is written in the corresponding internal number managing data. The virtual terminal processing means reads out the internal number of the actual terminal processing means from the corresponding own internal number managing data, and further reads out the state of the actual terminal processing means from the internal number managing data corresponding to the read-out internal number.

DESCRIPTION OF THE PREFERRED EMBODIMENT

Figure 1:
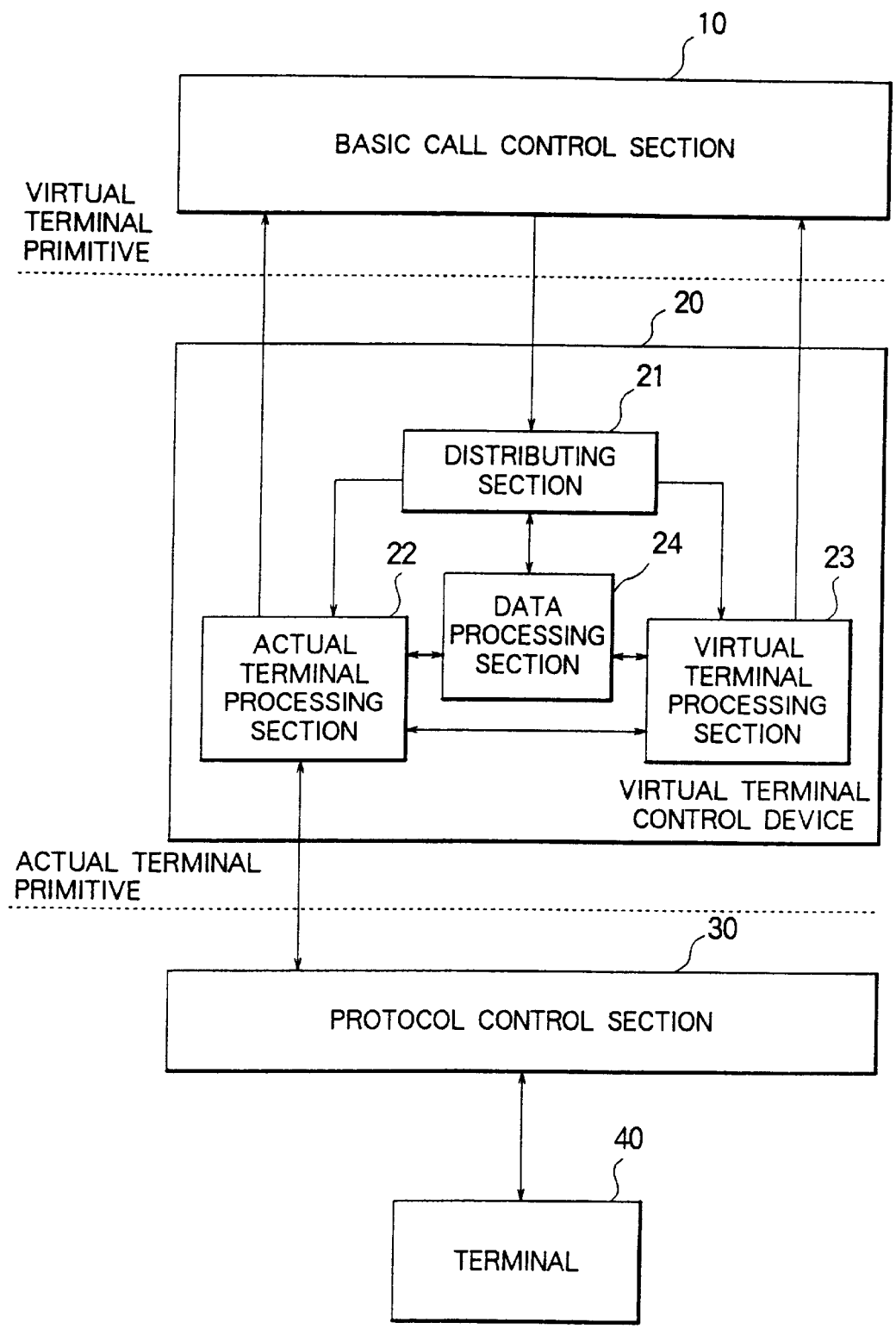
FIG. 1 is a block diagram showing an embodiment of the present invention.

Referring to FIG. 1, there is shown a block diagram of a call processing section of a switching system according to an embodiment of the present invention, which comprises a basic call control section 10, a virtual terminal control device 20, and a protocol control section 30 connecting between the basic call control section 10 and the virtual terminal control device 20.

The protocol control section 30 accommodates a plurality of terminals 40 (only one of which is shown) and is for performing control according to protocols corresponding to the terminals 40.

The basic call control section 10 is for performing a basic call connecting process for the terminals 40 through the protocol control section 30 and for further performing an additional service control process accompanied therewith. The basic call control section 10 has a function for controlling resources to connect the terminals 40 with the switching system and another function for detecting a state (idle, busy or the like) of the resources that are used by the terminals 40. Further, in order to perform the additional service control process, the basic call control section 10 has data and means for activating the additional services depending on a state of the basic call control section 10. Thus, the basic call control section 10 performs the basic call connecting process and the additional service control process for every corresponding call references (CR1) and can allocate a plurality of call references to the same terminal 40.

On the other hand, the number of call references that the protocol control section 30 can allocate to a particular terminal 40 is single or plural depending on a kind of the particular terminal 40. According to the present invention, the virtual terminal control device 20 provides means for requesting classification/allocation of the call references between the protocol control section 30 and the basic call control section 10.

The allocation of the call reference is actually performed by a call reference managing section (not shown). When a call sending request is received from the terminal 40, the protocol control section 30 makes a request to the call reference managing section for allocation of the call reference and further makes a call sending request to the basic call control section 10 per allocated call reference. On the other hand, when a call receiving request is received externally, the basic call control section 10 makes a request to the call reference control section for allocation of the call reference and causes the terminal 40 to receive a call via the protocol control section 30 according to the allocated call reference. A subscriber's number is assigned to the terminal 40 in advance. Since the subscriber's number is converted into a logical normalized subscriber's number in the switching system and carried by an interface signal, the basic call control section 10 and the protocol control section 30 know the correspondence between the call reference and the normalized subscriber's number.

The protocol control section 30 and the virtual terminal control device 20 are interfaced via a primitive (actual terminal primitive) prescribed based on a corresponding protocol, while the basic call control section 10 and the virtual terminal control device 20 are interfaced via a common primitive (virtual terminal primitive) prescribed based on an intelligent protocol which enables allocation of a plurality of call references to one terminal 40. The virtual terminal primitive includes IAM (initial address message), ACM (address complete message), CPG (call progress message), ANM (answer message), INF (additional information), HOLD (hold), HOLD-ACK (hold acknowledge), RETRIEVE (hold release), RETRIEVE-ACK (hold release acknowledge) and others. As the actual terminal primitive, a portion of the virtual terminal primitives are used depending on the protocol concerned.

The virtual terminal control device 20 includes a data processing section 24, a distributing section 21, an actual terminal processing section 22 and a virtual terminal processing section 23. The data processing section 24 stores terminal identifying data (normalized subscribers' numbers) indicating that a plurality of call references processed by the basic call control section 10 and the protocol control section 30, respectively, are for the same terminal 40, call reference correspondence data indicative of a connectable correspondence between each of call references for sending and receiving relative to the basic call control section 10 and each of call references for sending and receiving relative to the protocol control section 30, terminal classification data (terminal processing section classification) for classifying each of the call references of the basic call control section 10 into an actual terminal call reference corresponding to the call reference of the protocol control section 30 or into a virtual terminal call reference not corresponding thereto, and various kinds of data and tables, and processes reading/writing/erasing requests received from other sections. The distributing section 21 receives a signal, as an event signal which is an event of call reference correspondence, from the basic call control section 10, and refers to the data in the data processing section 24 based on the call reference represented by the event signal so as to classify and output the signal to the actual terminal processing section 22 or the virtual terminal processing section 23. The actual terminal processing section 22 has means responsive to an incoming signal for determining and executing an operation per state while shifting the state. When receiving a signal from the basic call control section 10 via the distributing section 21, the actual terminal processing section 22 looks up the data in the data processing section 24 so as to convert the call reference represented by the received signal into the corresponding call reference of the protocol control section 30 and sends it to the protocol control section 30. When receiving another signal which is another event of call reference correspondence, from the protocol control section 30, the actual terminal processing section 22 looks up the data in the data processing section 24 so as to convert the call reference represented by the signal into the corresponding call reference of the basic call control section 10 and sends it to the basic call control section 10. When receiving still another signal from the virtual terminal control section 23, the actual terminal processing section 22 carries out a designated process and sends a signal to the basic call control section 10. When detecting a changing trigger for the call reference correspondence data and the terminal classification data in the data processing section 24, the actual terminal processing section 22 changes these data. The virtual terminal processing section 23 reads out a state of the actual terminal processing section 22 in response to receipt of a signal from the basic call control section 10 via the distributing section 21. Depending on the received signal and the state of the actual terminal processing section 22, the virtual terminal processing section 23 executes a process, sends a signal to the basic call control section 10 and outputs a signal designating an operation of the actual terminal processing section 22. When detecting a changing trigger for the call reference correspondence data and the terminal classification data in the data processing section 24, the virtual terminal processing section 23 changes these data.

Figure 2A:
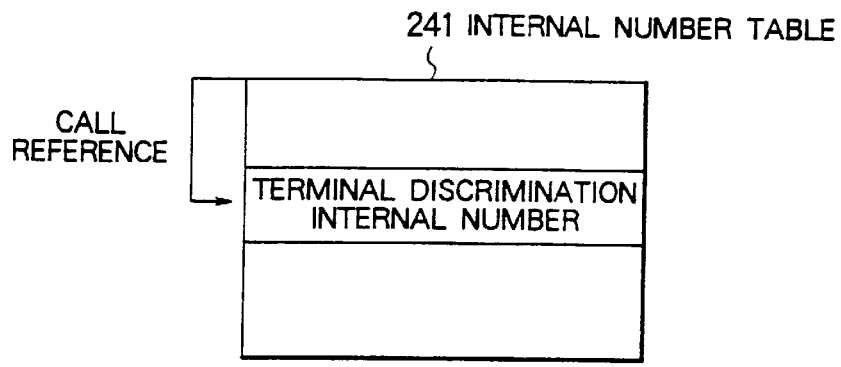
FIG. 2A is a diagram showing a structural example of an internal number table.
Figure 2B:
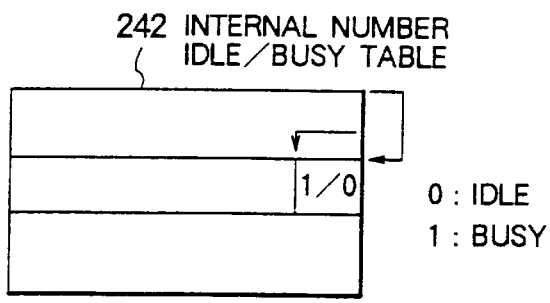
FIG. 2B is a diagram shown an structural example of an internal number idle/busy table.
Figure 3:
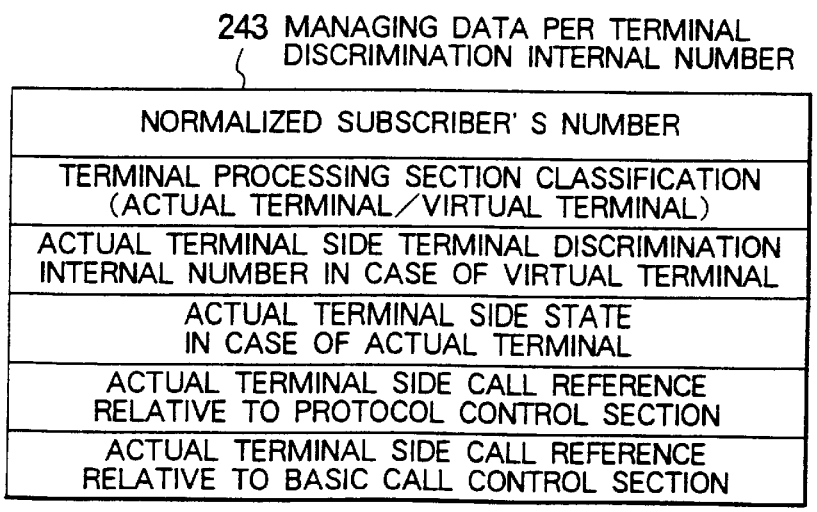
FIG. 3 is a diagram shown a structural example of managing data per terminal discrimination internal number.
Figure 4:
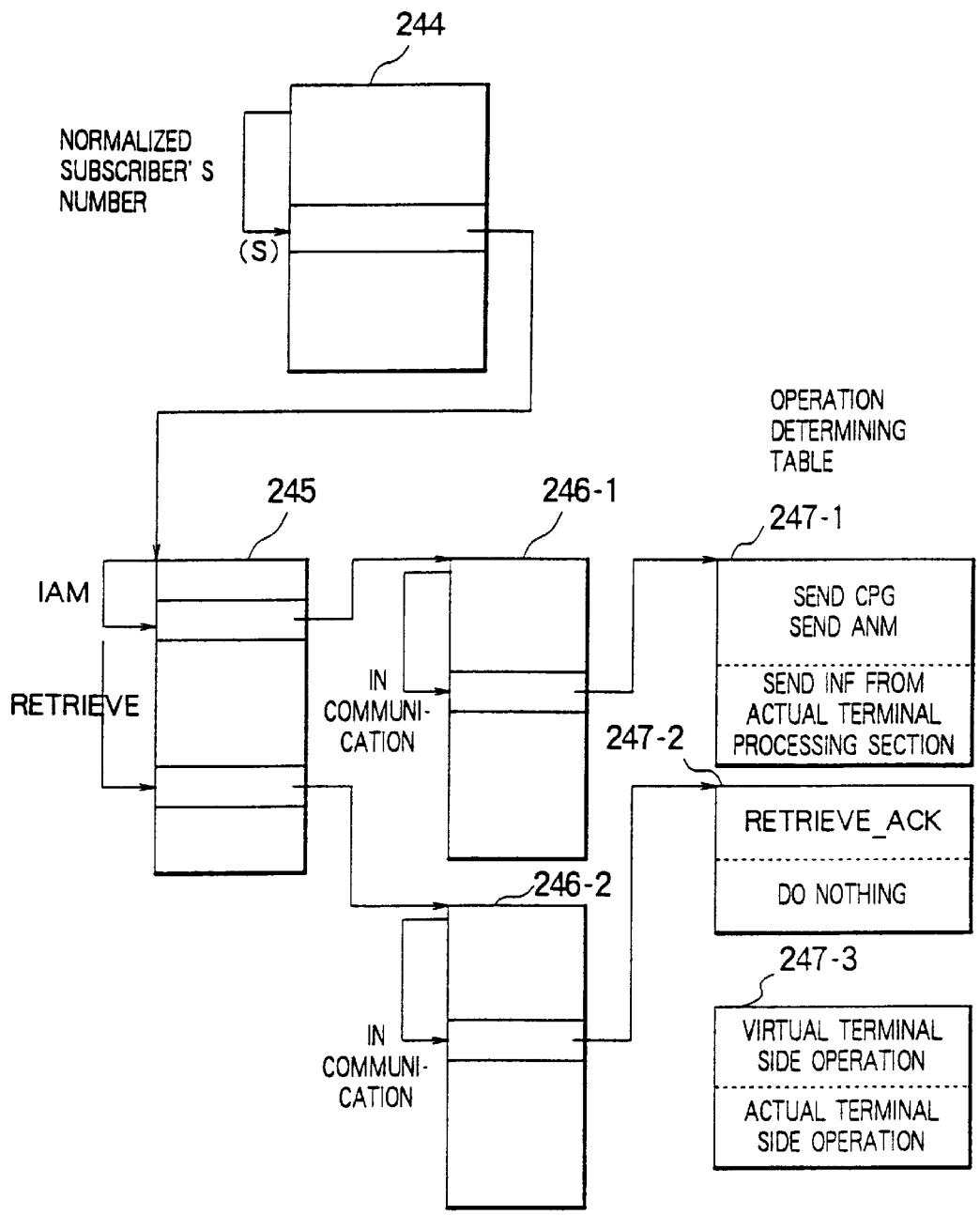
FIG. 4 is a diagram showing a structural example of operation determining tables and various index tables for referring to the operation determining table.
Figure 5:
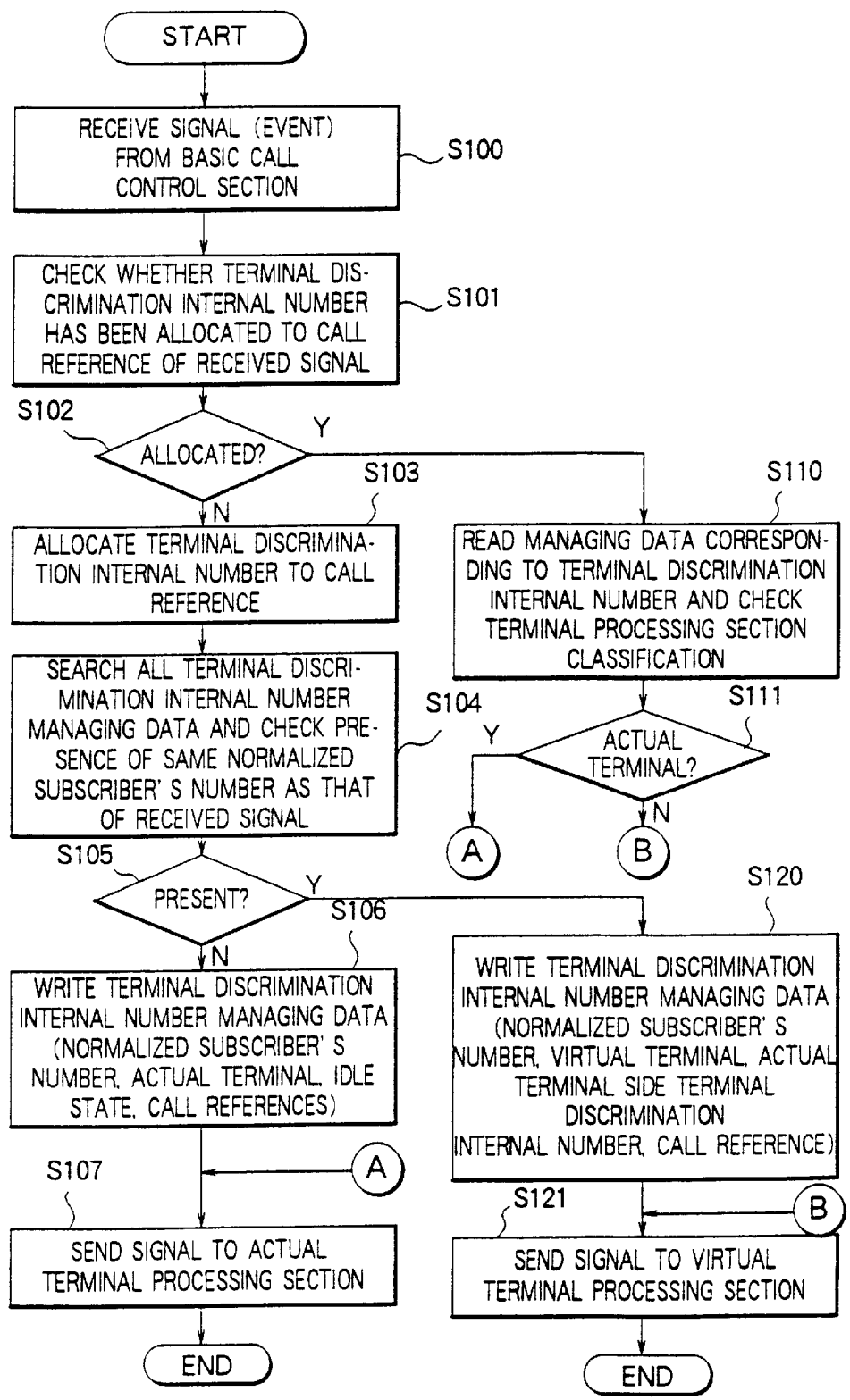
FIG. 5 is a flowchart showing an operation of a distributing section according to the embodiment of FIG. 1.
Figure 6:
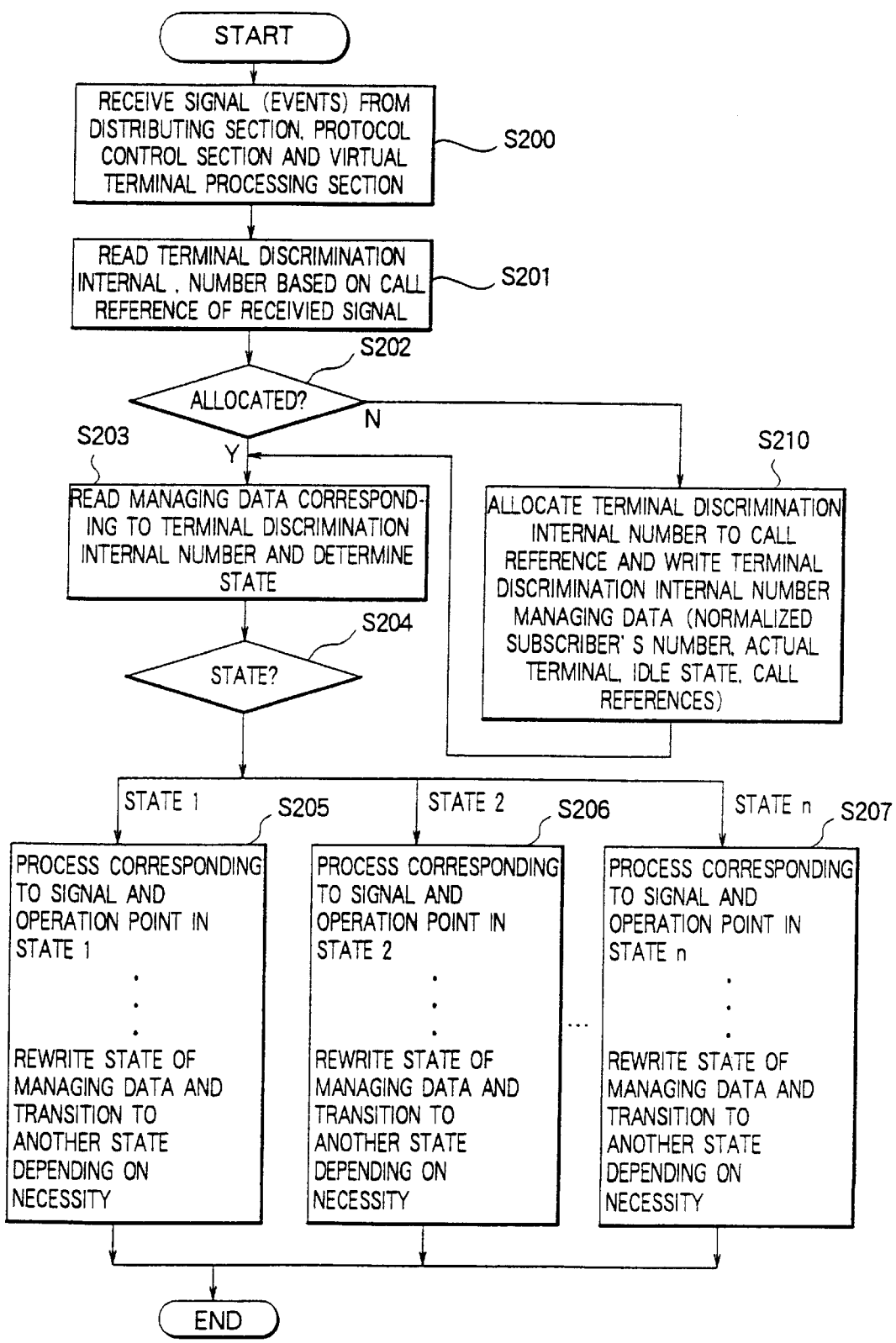
FIG. 6 is a flowchart showing an operation of an actual terminal processing section according to the embodiment of FIG. 1.
Figure 7:
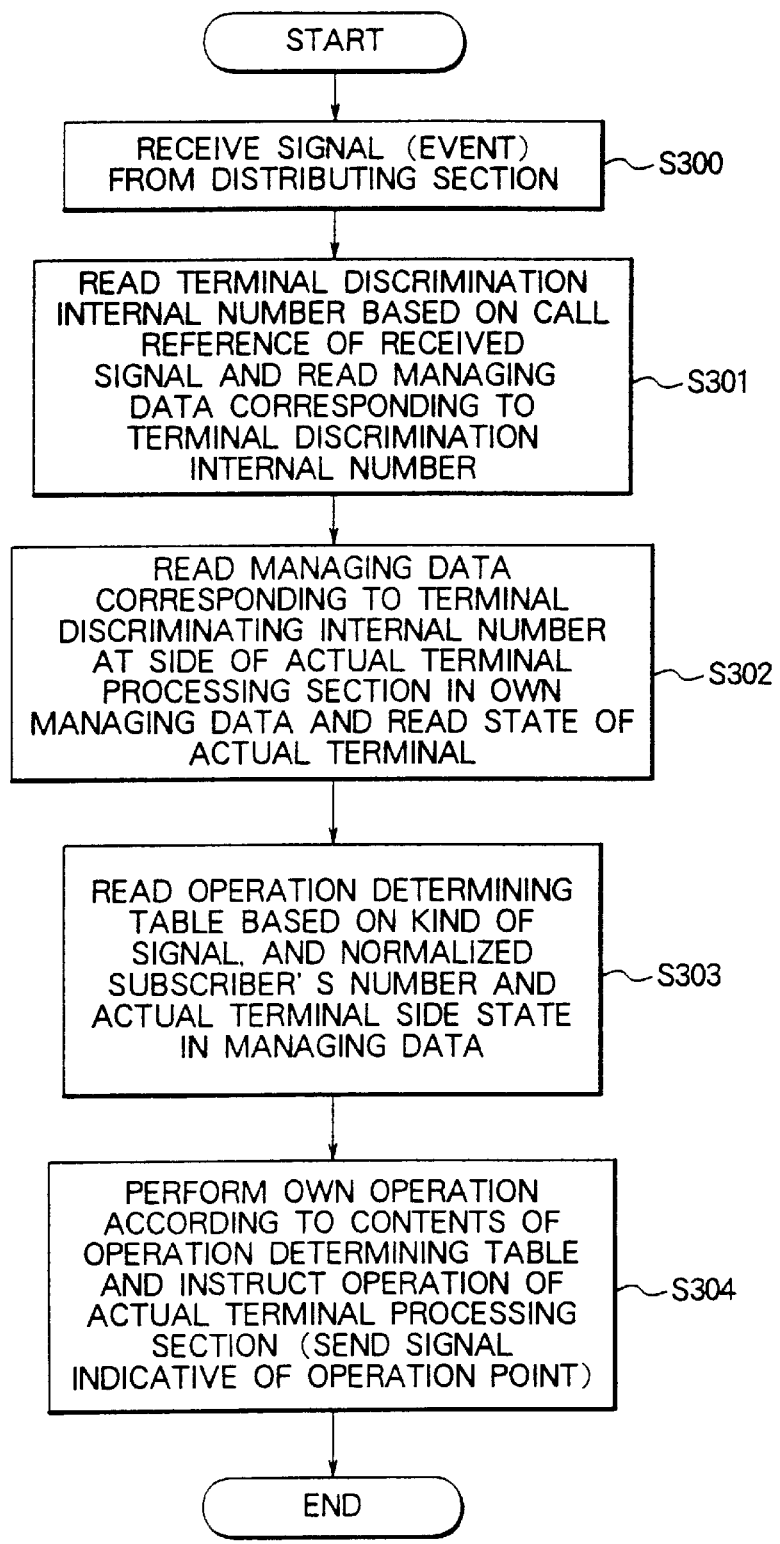
FIG. 7 is a flowchart showing an operation of a virtual terminal processing section according to the embodiment of FIG. 1.

Now, description will be made as regards operations of the distributing section 21, the actual terminal processing section 22 and the virtual terminal processing section 23 in case of the terminal 40 (and the protocol control section 30) being capable of processing only the single call reference, with reference to FIGS. 5, 6 and 7 showing flowcharts of the respective operations and FIGS. 2, 3 and 4 showing various data and tables in the data processing section 24. The distributing section 21 receives a signal (event) of call reference correspondence from the basic call control section 10 (step S100 in FIG. 5), and refers to an internal number table 241 (see FIG. 2A) in the data processing section 24 using the received call reference as a key so as to check whether or not there has already been allocated a terminal discrimination internal number for performing a process inside the virtual terminal control device 20 and determining a processing target (steps S101 and S102). If not allocated, the distributing section 21 searches an internal number idle/busy table 242 (see FIG. 2B) in the data processing section 24, allocates one of terminal discrimination internal numbers which are idle, and writes it in the internal number table 241 and an internal number idle/busy table 242 (step S103). In a first signal among signals designating a certain call reference, a corresponding normalized subscriber's number is also designated. The data processing section 24 includes therein managing data 243 (see FIG. 3), per terminal discrimination internal number (call reference), composed of a corresponding normalized subscriber's number; a classification of a terminal processing section for processing, that is, the actual terminal processing section 22 or the virtual terminal processing section 23; a terminal discrimination internal number at a side of the actual terminal processing section corresponding to the same normalized subscriber's number in case of the terminal processing section classification for processing being the virtual terminal processing section; a state of the actual terminal processing section in case of the terminal processing section classification for processing being the actual terminal processing section; a call reference to be used by the actual terminal processing section when sending and receiving signals relative to the protocol control section 30; a call reference to be used by the actual terminal processing section when sending and receiving signals relative to the basic call control section 10; and others. After allocating the terminal discrimination internal number, the distributing section 21 searches the managing data of all the recorded terminal discrimination internal numbers and checks whether the same normalized subscriber's number as the designated normalized subscriber's number is recorded (steps S104 and S105). If not recorded, the distributing section 21 decides meaning the first call reference allocation to the terminal 40 and determines that it is connectable at the actual terminal processing section 22. Then, the distributing section 21 newly writes managing data 243 including the normalized subscriber's number, the terminal processing section classification as being the actual terminal processing section 22, the state as being idle, the call reference relative to the protocol control section 30, and the call reference relative to the basic call control section 10 (step S106), and sends the received signal to the actual terminal processing section 22 (step S107). If the same normalized subscriber's number has been recorded in the process at steps S104 and S105, the distributing section 21 decides the second call reference allocation to the terminal 40 and determines that it is not connectable at the actual terminal processing section 22 but should be virtually connected at a side of the virtual terminal processing section 23 (the number of processable call references at the actual terminal processing section 22 is determined based on a classification of the protocol previously designated and controlled by the protocol control section 30). Then, the distributing section 21 newly writes managing data 243 including the normalized subscriber's number, the terminal processing section classification as being the virtual terminal processing section 23, the terminal classification internal number at a side of the actual terminal processing section 22 corresponding to the normalized subscriber's number, and the call reference relative to the basic call control section 10 (step S120), and sends the received signal to the virtual terminal processing section 23 (step S121). If the terminal discrimination internal number has been allocated in the process at steps S101 and S102, the distributing section 21 reads out the managing data of that terminal discrimination internal number to check the terminal processing section classification (step S111). If the actual terminal processing section is designated, the distributing section 21 sends the signal to the actual terminal processing section 22 (step S107). On the other hand, if the virtual terminal processing section is designated, the distributing section 21 sends the signal to the virtual terminal processing section 23 (step S121).

The actual terminal processing section 22 receives the signals from the distributing section 21, the protocol control section 30 and the virtual terminal processing section 23 and stores them in a cue (not shown) (step S200 in FIG. 6). The actual terminal processing section 22 takes out the signals in sequence from the cue and refers to the internal number table 241 in the data processing section 24 using the call reference of the signal as a key so as to read out the terminal discrimination internal number (steps S201 and S202). If the terminal discrimination internal number is not obtained, the actual terminal processing section 22 determines it to be the first call reference allocation to the terminal 40. Then, like in the processes at steps S103 to S106 of the distributing section 21, the actual terminal processing section 22 allocates the terminal discrimination internal number to the call reference and writes it in the internal number table 241 and the internal number idle/busy table 242, and newly writes managing data 243 including the normalized subscriber's number, the terminal processing section classification as being the actual terminal processing section 22, the state as being idle, the call reference relative to the protocol control section 30, and the call reference relative to the basic call control section 10 (step S210). If the terminal discrimination internal number is obtained, the corresponding managing data 243 in the data processing section 24 is read out. If the terminal processing section classification in the managing data 243 is the actual terminal processing section, the actual terminal processing section 22 reads out the current state of the actual terminal processing section 22 therefrom, while, if the terminal processing section classification in the managing data 243 is the virtual terminal processing section, the actual terminal processing section 22 reads out the second managing data 243 corresponding to the terminal discrimination internal number at a side of the actual terminal processing section in the first managing data 243 and further reads out the current state of the actual terminal processing section 22 from the second managing data 243, and then the actual terminal processing section 22 checks the contents of the state (steps S203 and S204). Per state (state 1, state 2, . . . , state n), such as "idle" or "busy" and depending on the received signal and the operation point (included only in the signal from the virtual terminal processing section 23), the actual terminal processing section 22 performs processes, such as, signal analysis and signal sending, according to an operation procedure designated in advance. As the call reference of the signals to be sent to the protocol control section 30 and the basic call control section 10 from the actual terminal processing section 22, the "call reference relative to the protocol control section" and the "call reference relative to the basic call control section" recorded in the managing data 243 from which the state of the actual terminal processing section has been read out, are used. By changing a combination of the "call reference relative to the protocol control section" and the "call reference relative to the basic call control section", the call reference connectable from the basic call control section 10 to the protocol control section 30 can be switched. Details of this switching operation will be described later. When the execution of all the processes is completed, the actual terminal processing section 22 makes transition to another state and rewrites the state contents of the managing data 243 depending on necessity (steps S205, S206, . . . , S20n).

The virtual terminal processing section 23 receives the signal from the distributing section 21 and stores it in the queue (not shown) (step S300 in FIG. 7). The virtual terminal processing section 23 takes out the signals in sequence from the queue and refers to the internal number table 241 in the data processing section 24 using the call reference of the signal as a key so as to read out the terminal discrimination internal number, and further reads out the managing data 243 corresponding to the read-out terminal discrimination internal number (steps S301). The virtual terminal processing section reads out the second managing data 243 corresponding to the terminal discrimination internal number at a side of the actual terminal processing section 22 in the own first managing data 243 and further reads out the state of the actual terminal processing section 22 (step S302).

As shown in FIG. 4, the virtual terminal processing section 23 refers to various index tables 244, 245, 246-1 and 246-2 based on the normalized subscriber's number, the kind of the received signal and the state of the actual terminal processing section, and selects and reads out one of operation determining tables 247-1, 247-2 and 247-3 (step S303). In each of the operation determining tables

247-1, ..., 247-3 shown in FIG. 4, an upper line represents an operation to be executed by the virtual terminal processing section 23, while a lower line represents an operation to be executed by the actual terminal processing section 22. According to the contents of the read-out operation determining table, the virtual terminal processing section 23 sends the signal to the basic call control section 10 and further sends the signal, including the operation point, to the actual terminal processing section 22 so as to cause it to perform the operation corresponding to the operation point. For example, operation point "0" represents "do nothing", operation point "1" "INF analysis" and operation point "2" "send INF to basic call control section". As the call reference to be sent to the basic call control section 10 from the virtual terminal processing section 23, the call reference of the signal received from the basic call control section 10 via the distributing section 21 is used. As appreciated, this call reference is the same as the "call reference relative to the basic call control section" in the own managing data 243.

Now, the entire operation will be described. First, the operation will be described as regards a call waiting service as an example with reference to sequence diagrams of FIGS. 8 and 9, wherein the protocol control section 30 is associated with an analog terminal (conventional telephone set) as the terminal 40 and thus corresponds to an unintelligent protocol allocating only one call reference. The virtual terminal control device 20 is instructed in advance that the protocol classification of the protocol control section 30 is the signal call mode. As described before, the distributing section 21 delivers only one call reference to the actual terminal processing section 22 relative to the same normalized subscriber's number corresponding to the terminal 40 and remaining call references to the virtual terminal processing section 23, and the actual terminal processing section 22 connects between the basic call control section 10 and the protocol control section 30 in cooperation with the distributing section 21, the virtual terminal processing section 22 and the data processing section 24.

Figure 8:
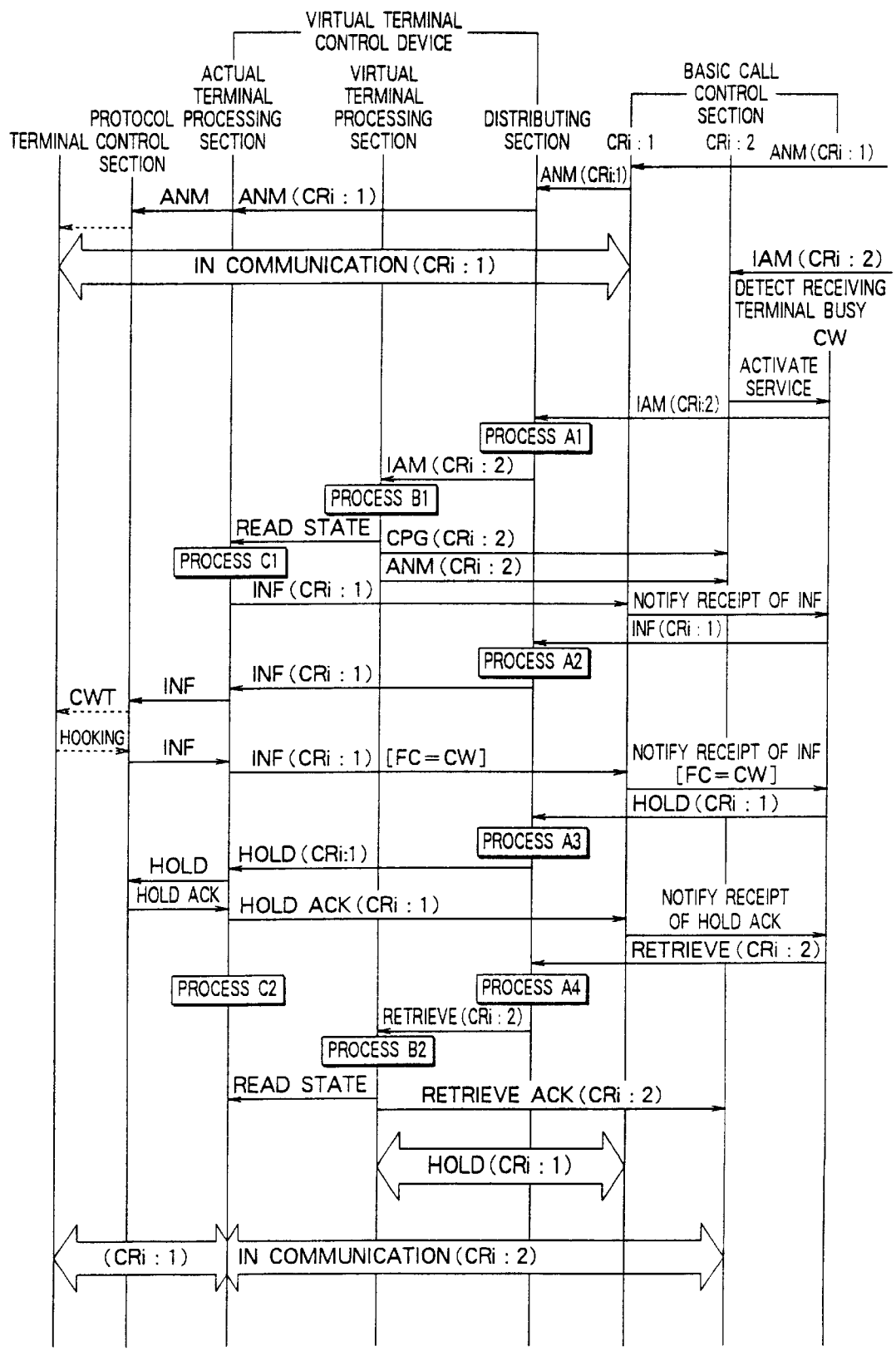
FIG. 8 is a diagram showing a first operation sequence of a CW service in an analog single CR1 mode.

The terminal 40 is a caller (sender). When a counterpart terminal goes off hooks (operation of raising a handset), a switching system employing the counterpart terminal notifies the signal ANM (answer message) to the switching system employing the terminal 40 via the network connecting the switching systems. Thus, both terminals are brought into a communication or busy state. The basic call control section 10, the actual terminal processing section 22 in the virtual terminal control device 20, and the protocol control section 30 are arranged to operate based on the internally prescribed state in response to a certain event (signal) from the exterior, while shifting the state. According, as shown in FIG. 8 as the initial state, the protocol control section 30, the actual terminal processing section 22 and the basic call control section 10 are all busy in communication.

The basic call control section 10 receives the signal IAM (Initial address message) from a side of the network. Upon receiving the signal IAM, that is, a new call setup request, from the network side, the basic call control section 10 allocates a new call reference. For facilitating explanation, a call reference that is busy is represented by CRi:1, and a call reference newly requesting a call setup to the terminal 40 is represented by CRi:2. Since the basic call control section 10 receives the call setup request relative to the terminal 40, the basic call control section 10 tries to catch the resource used by the terminal 40. However, since the terminal 40 is busy, the basic call control section 10 can not catch the resource. Accordingly, the basic call control section 10 detects the receiving terminal being busy and activates the call waiting (CW) service. Since the CW service requires notification to the terminal 40 that the new call setup request is received, the signal IAM is sent to the terminal 40 in communication using CRi:2.

Figure 12A:
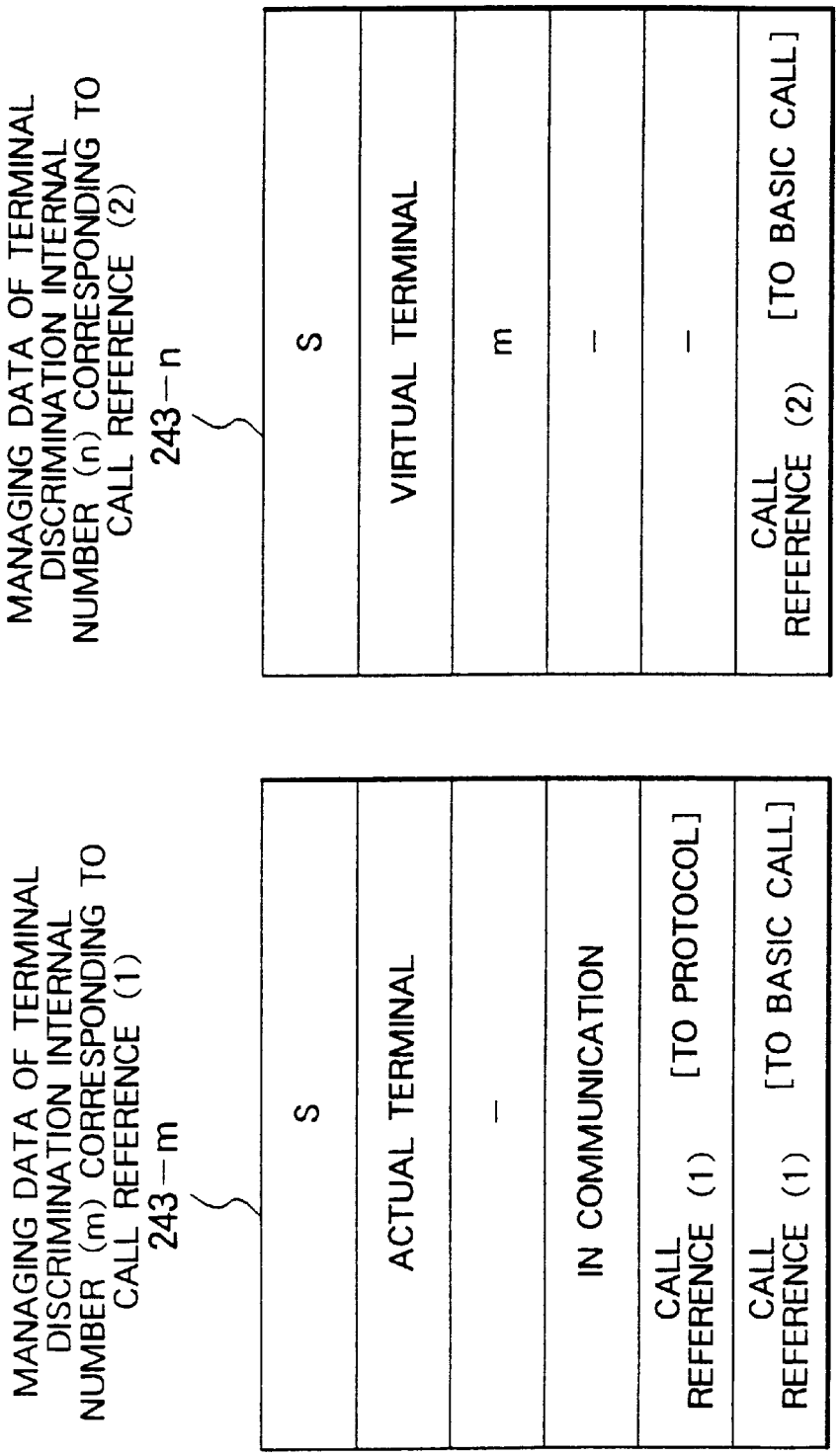
FIGS. 12A and 12B are diagrams showing states before and after connection exchange relative to call references in an actual terminal processing section and a virtual terminal processing section, respectively.
Figure 12B:
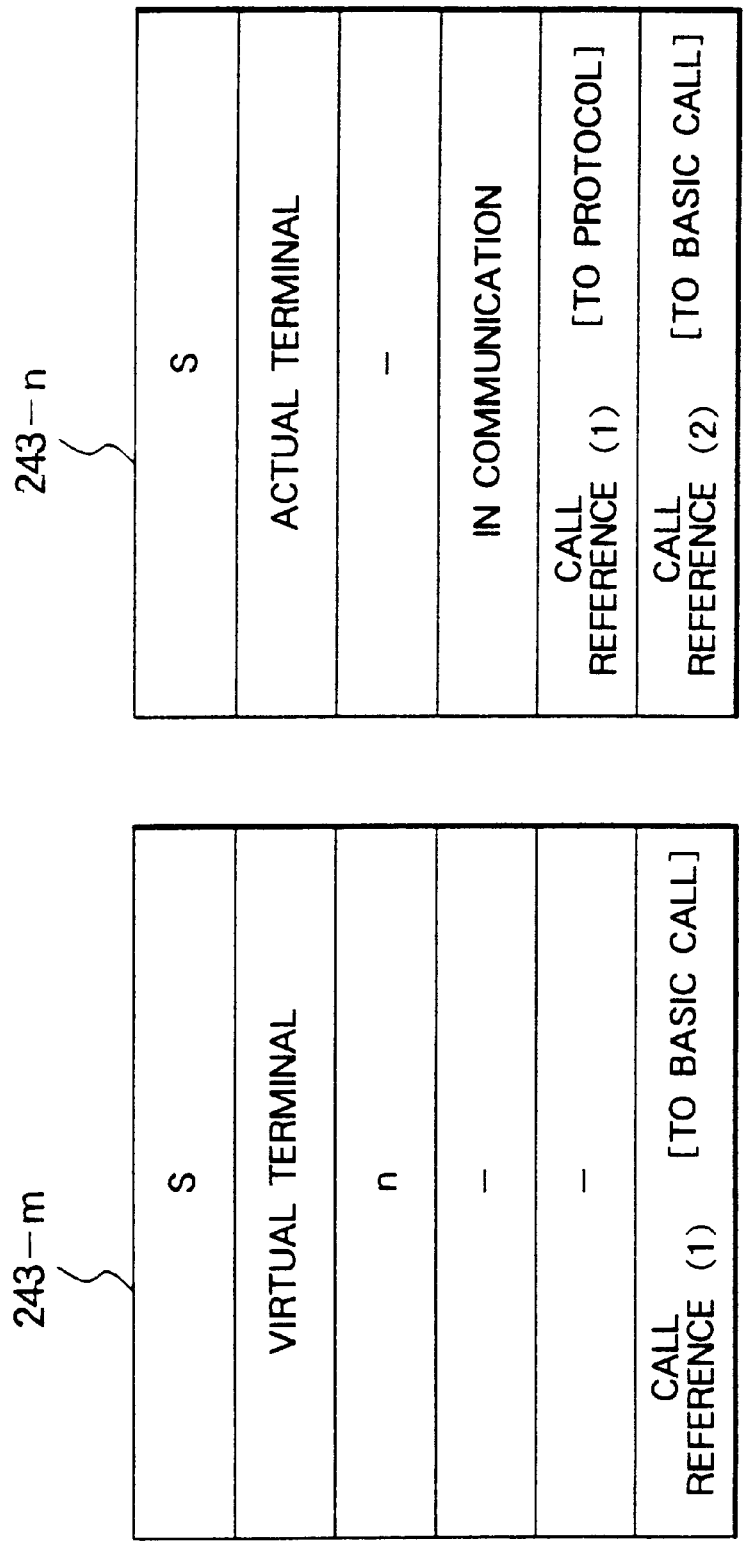

In the virtual terminal control device 20, the distributing section 21 receives the signal IAM. The distributing section 21 has a function to allocate the terminal discrimination internal number (hereinafter referred to as "internal number") per call reference using the internal number table 241 in the data processing section 24 in response to receipt of the signal (event). Accordingly, the distributing section 21 allocates an internal number (for example, n) to CRi:2 (it is assumed that an internal number, for example, m is allocated to CRi:1). Further, it is checked based on the managing data 243 corresponding to the internal number in the data processing section 24 whether or not another internal number is allocated to the terminal 40. In this state, as shown in the managing data 243-m in FIG. 12A, the internal number "m" allocated to CRi:1 is connected to the terminal 40 via the actual terminal processing section 22 so that the managing data 243-n shown in FIG. 12B is newly written, and the signal IAM is sent to the virtual terminal processing section 23 (process A1 in FIG. 8).

When detecting receipt of the signal IAM of CRi:2, the virtual terminal processing section 23 reads out the normalized subscriber's number (for example, S) and the internal number "m" at a side of the actual terminal processing section 22 from the managing data 243-n of the internal number "n" corresponding to CRi:2, and further reads out the state "busy" from the managing data 243-m of the internal number "m". The virtual terminal processing section 23 refers to the tables 244, 245 and 246-1 in the data processing section 24 using the normalized subscriber's number "S", the signal "IAM" and the state "busy" as keys, and reads out the operation determining table 247-1. The virtual terminal processing section 23 sends the signal CPG (call progress message) and the signal ANM of CRi:2 to the basic call control section 10 according to the contents of the operation determining table 247-1. Since the actual terminal side operation is "sending the signal INF (additional information)", the virtual terminal processing section 23 sends the signal including operation point "2" to the actual terminal processing section 22 so as to request the corresponding operation (process B1).

In response to the operation request, the actual terminal processing section 22 sends the signal INF (CRi:1) to the basic call control section 10 so as to notify that the signal from the virtual terminal processing section 23 is received. Thus, being controlled corresponding to CRi, the basic call control section 10 can determine which internal number allocated to the actual terminal processing section 22 is linked with the internal number allocated to the virtual terminal processing section 23 (process C1).

Since the basic call control section 10 receives the signal INF using busy CRi:1, it notifies to the CW service receipt of the signal INF. In the CW service, by sending the signal INF to the terminal 40 in busy state using busy CRi:1, the terminal 40 is notified that a call is received during communication.

In response to receipt of the signal INF, the distributing section 21 looks up the internal number "m" corresponding to CRi (CRi:1) and determines that it is connected to the terminal 40 from the managing data 243-m, so as to send the signal INF to the actual terminal processing section 22 (process A2).

The actual terminal processing section 22 notifies the received signal INF to the protocol control section 30 using the call reference relative to the protocol control section in the managing data 243-m (at this time point, the same as the call reference (CRi:1) relative to the basic call control section 10). In response to receipt of the signal INF, the protocol control section 30 sends a call waiting tone (CWT) to the terminal 40. At the terminal 40, since presence of the incoming call is recognized by hearing the CWT, the hooking operation can be performed. In response to the hooking operation, the protocol control section 30 sends the signal INF to the actual terminal control section 22. The actual terminal processing section 22 notifies the signal INF to the basic call control section 10 using the call reference (CRi:1) relative to the basic call control section in the managing data 243-m.

The basic call control section 10 notifies the CW service that the signal INF is received. The CW service, as an operation after receipt of the signal INF, sends the signal HOLD (hold) using busy CRi:1.

In response to receipt of the signal HOLD via CRi:1, the distributing section 21 sends the signal HOLD to the actual terminal processing section 22 (process A3).

Upon receipt of the signal HOLD, the actual terminal processing section 22 sends the signal HOLD to the protocol control section 30 and is set in a waiting state for the signal HOLD-ACK (hold acknowledge). In response to receipt of the signal HOLD-ACK, the actual terminal processing section 22 notifies it to the basic call control section 10. After sending the signal HOLD-ACK, the actual terminal processing section 22 prepares to switch the call reference for connecting to the basic call control section 10 to CRi:2 while maintaining the call reference for connecting to the protocol control section 30 to be CRi:1. Specifically, the terminal processing section classification in the managing data 243-m in the data processing section 24 shown in FIG. 12A is changed from the actual terminal to the virtual terminal. At this time, considering that a plurality of other internal numbers (call references) may be available relative to the same normalized subscriber's number "S", it is not yet determined which of those internal numbers is to be switched to the actual terminal processing section side. Accordingly, the internal number at the actual terminal processing section side is not yet set up. Thus, although the terminal processing section classification corresponding to the internal number "m" allocated to the call reference CRi:1 from the basic call control section 10 is the virtual terminal, the state of the actual terminal processing section and the call reference (CRi:1) relative to the protocol control section are held (process C2).

The basic call control section 10 notifies receipt of the signal HOLD-ACK to the CW service. Since the CW service operates recognizing the busy call and the hold call, the CW service sends, in response to receipt of the signal HOLD-ACK via CRi:1 representing the busy call, the signal RETRIEVE (hold release) using CRi:2 representing the hold call.

Since the signal RETRIEVE is received via CRi:2, the distributing section 21 sends it to the virtual terminal processing section 23 (process A4).

In response to receipt of the signal RETRIEVE, the virtual terminal processing section 23 reads out the state of the actual terminal processing section 22 through the data processing section 24 for determining the operation. As shown in FIG. 4, since the operation at the virtual terminal side upon receipt of the signal RETRIEVE during busy state is "sending the signal RETRIEVE-ACK (hold release acknowledge)" to the basic call control section 10, the virtual terminal processing section 23 sends the signal RETRIEVE-ACK to the basic call control section 10. Since the operation at the actual terminal side is "do nothing", the virtual terminal processing section 23 does not make the operation request to the actual terminal processing section 22 which, since no operation request is received, does not perform the signal sending operation (process B2).

After sending the signal RETRIEVE-ACK, the virtual terminal processing section 23 switches the call reference for connection to the basic call control section 10 from CRi:2 to CRi:1. Specifically, the virtual terminal processing section 23 finds out the managing data 243-m with the internal number "m" which holds the "state of the actual terminal processing section" while the normalized subscriber's number being the same as the normalized subscriber's number "S" of the internal number "n" corresponding to CRi:2 and the terminal processing section classification being the virtual terminal side. The virtual terminal processing section 23 transfers the state "busy" of the actual terminal processing section and the call reference. "CRi:1" from the managing data 243-m into the managing data 243-n of the internal number "n", changes the terminal processing section classification of the managing data 243-n from the virtual terminal of the actual terminal, the writes the internal number "n" in the managing data 243-m (see FIG. 12B). Though the foregoing processes, the call reference CRi:1 and CRi:2 relative to the basic call control section 10 have been exchanged between the actual terminal processing section 22 and the virtual terminal processing section 23. Upon sending the signal, the actual terminal processing section 22 mutually converts CRi:2 relative to the basic call control section 10 and CRi:1 relative to the protocol control section 30 using the managing data 243-n.

Since the basic call control section 10 has means for switching the resource for connection to the terminal 40 according to the procedure of switching between the busy call and the hold call, CRi:1 is "hold" and CRi:2 is "busy". The signal of CRi:2 sent from the basic call control section 10 is delivered to the actual terminal processing section 22 from the distributing section 21 based on the corresponding managing data 243-n, and sent to the protocol control section 30 as a signal of CRi:1 from the actual terminal processing section 22. The signal of CRi:1 sent from the basic call control section 10 is delivered to the virtual terminal processing section 23 from the distributing section 21 based on the corresponding managing data 243-m. On the other hand, the signal of CRi:1 sent from the protocol control section 30 is sent to the basic call control section 10 as a signal of CRi:2 from the actual terminal processing section 22 based on the managing data 243-n searched from the corresponding managing data 243-m. Specifically, although only one CRi (call reference) can be used relative to the same terminal 40 on the protocol employing the CW service, the CW service can be achieved using a plurality of (two) CRi on the basic call control section 10.

Figure 9:
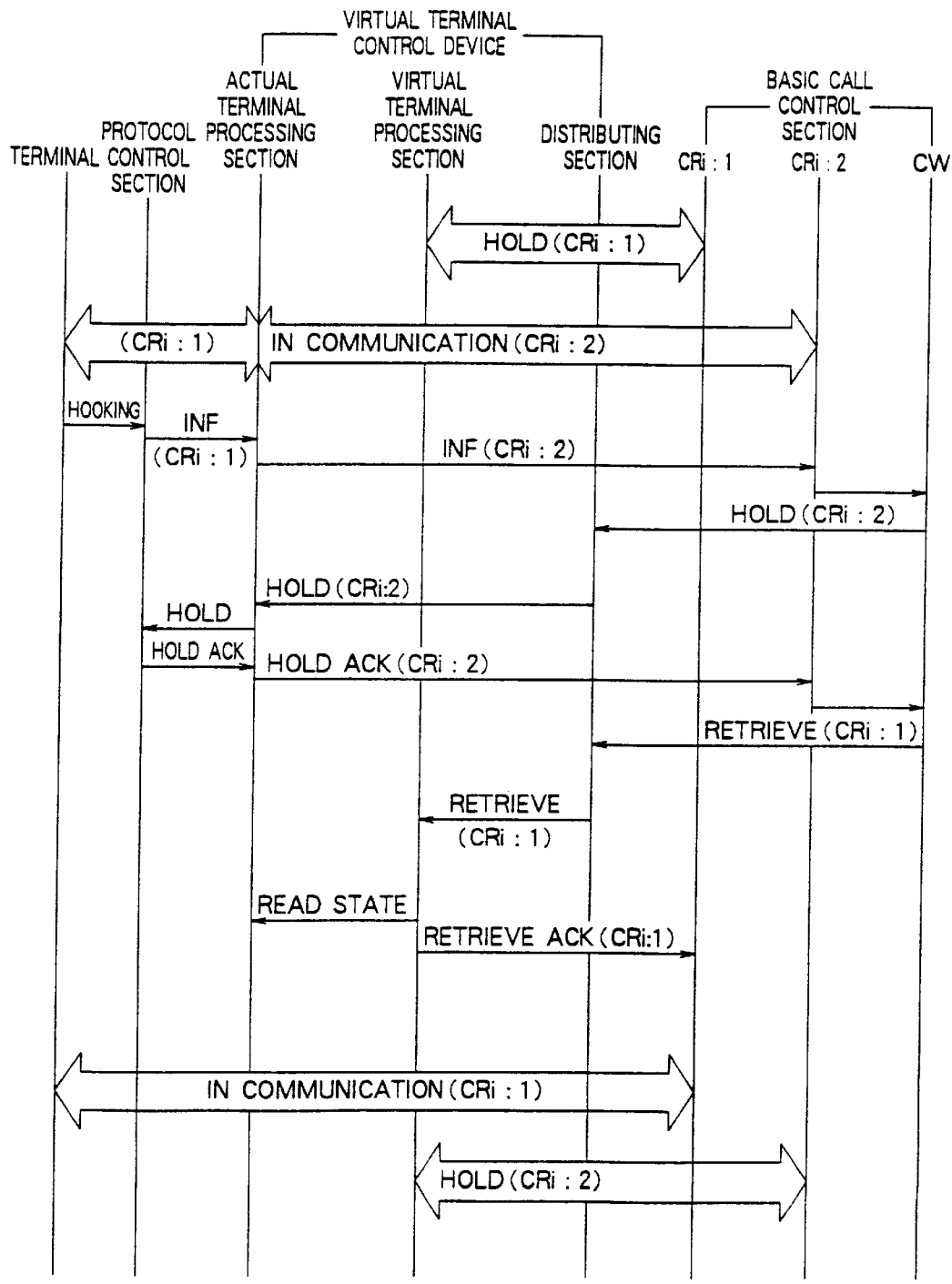
FIG. 9 is a diagram showing a second operation sequence of the CW service in the analog single CR1 mode.

If the hooking operation is performed again at the terminal 40 in this state, CRi:1 becomes "busy" and CRi:2 becomes "hold" due to the operations similar to the foregoing operations so that the initial state can be restored (see FIG. 9).

Figure 10:
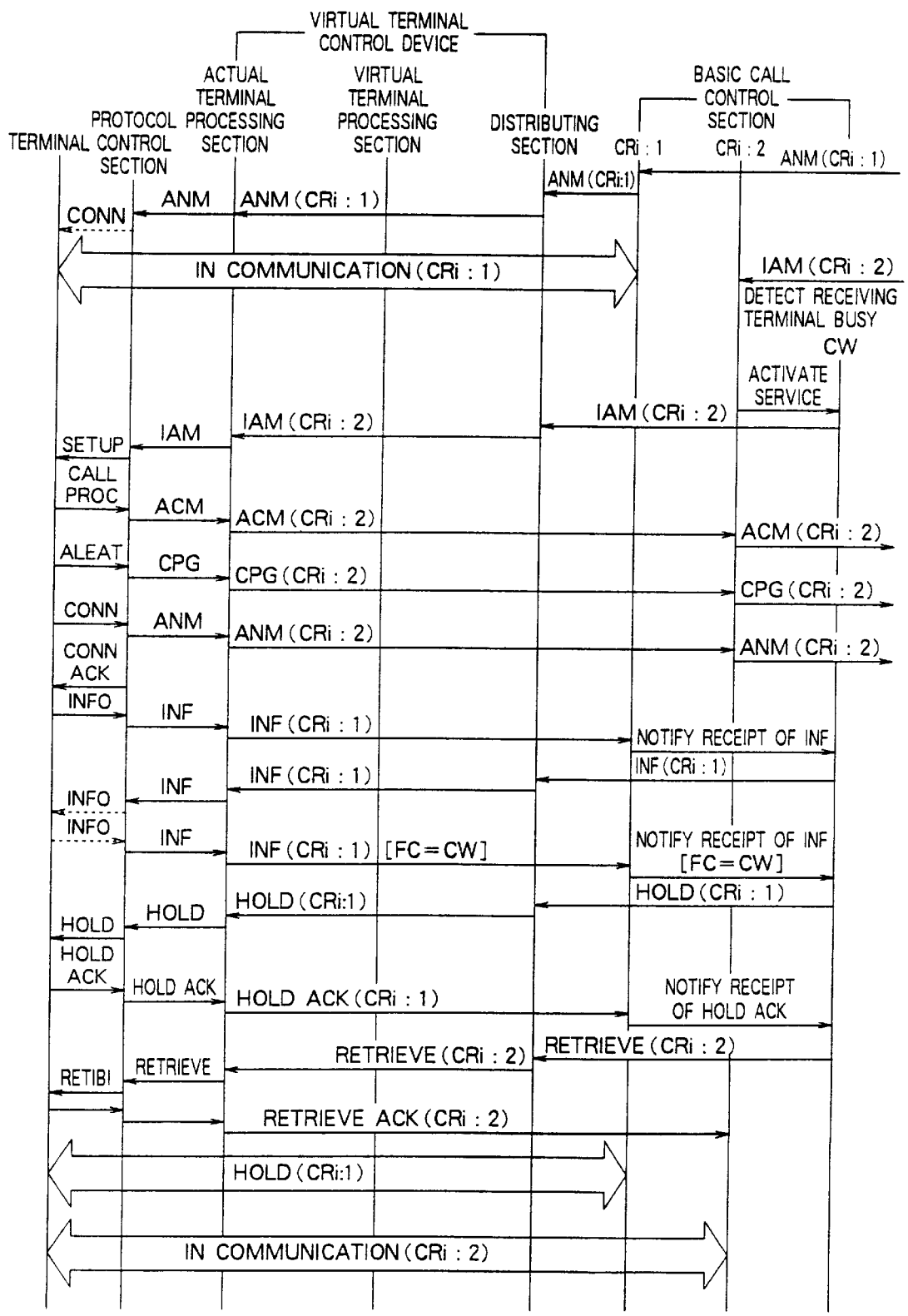
FIG. 10 is a diagram showing an operation sequence of a CW service in a Q. 931 plural CR1 mode.

Now, the operation will be described as regards a call waiting service as an example with reference to a sequence diagram of FIG. 10, wherein the protocol control section 30 is associated with an intelligent terminal 40 and corresponds to an intelligent protocol, such as Q.931 protocol, allowing a plurality of CRi to be used.

The distributing section 21 of the virtual terminal control device 20 is instructed, in advance, of this protocol classification and recognizes that it is not necessary to deal with a portion of CRi in the own device so as to perform the actual terminal/virtual terminal control. The distributing section 21, along with the actual terminal processing section 22, transparently transfers the primitives between the basic call control section 10 and the protocol control section 30.

It is assumed that the terminal 40 is in communication with a counterpart terminal connected to the network via the basic call control section 10 and that the resources which can be used by the terminal 40 are all in use. In response to receipt of a new call setup request IAM (CRi:2) relative to the terminal 40 from the network side, the basic call control section 10 tries to catch the resource used by the terminal 40. However, as described above, since all the resources of the terminal 40 are in use, the basic call control section 40 can not catch the resource. Accordingly, the basic call control section 10 detects the receiving terminal being busy and activates the call waiting (CW) service. Since the CW service requires notification to the terminal 40 that the new call setup request is received, the signal IAM is sent to the terminal 40 in communication using CRi:2.

Since the protocol control section 30 can control the terminal 40 using a plurality of CRi, the protocol control section 30 makes a SETUP request to the terminal 40. Thereafter, the protocol control section 30 and the basic call control section 10 makes transition until sending of the signal ANM. An operator of the terminal 40 recognizes it as notification of the incoming call during communication, and pushes a CW service switching button, for example, mapped on the key. Then, the signal INFO is sent to the protocol control section 30. Thereafter, the HOLD request is received relative to CRi:1 in busy state, and the signal RETRIEVE is received relative to CRi:2. Thus, CRi:1 becomes "hold", and CRi:2 becomes "busy". The added service (CW service) and the basic call control procedure at the basic call control section 10 in this case (intelligent protocol plural CRi mode) are the same as the foregoing procedure at the analog terminal. Thus, the difference between the protocols where the numbers of allocatable CRi (call references) to the same terminal are different, can be hidden relative to the basic call control section 10.

Figure 11:
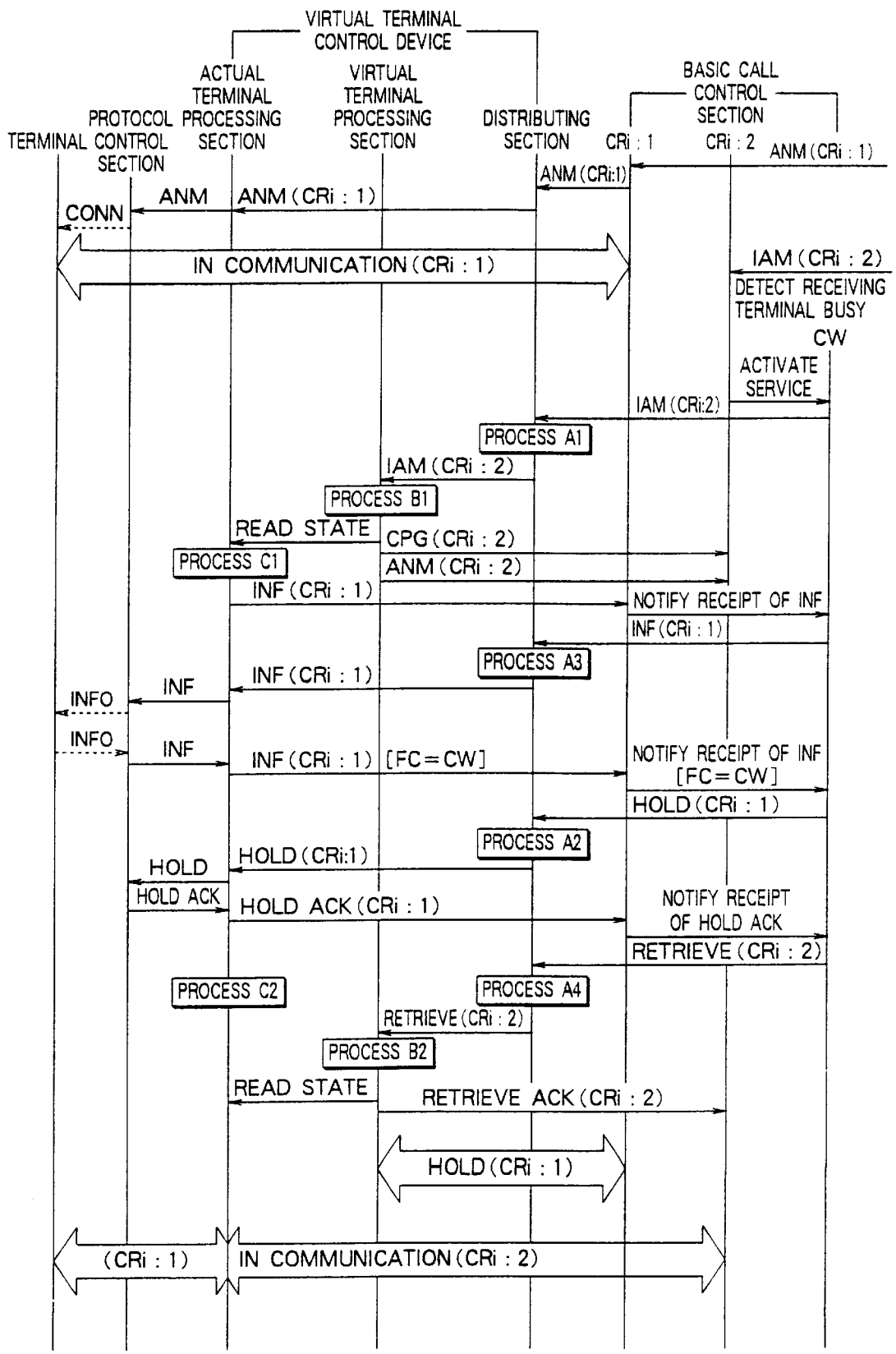
FIG. 11 is a diagram showing an operation sequence of a CW service in a Q. 931 single CR1 mode.

FIG. 11 is a sequence diagram of a call waiting service, wherein the protocol control section 30 employing the Q.931 protocol performs a control using the single CRi. Even in the single CRi mode using the intelligent protocol, the added service (CW service) and the basic call control procedure at the basic call control section 10 and the virtual terminal control device 20 are the same as those at the analog terminal, that is, in the single CRi mode using the unintelligent protocol. Thus, the sequence becomes similar to that shown in FIG. 8 except for the procedure (messages) between the terminal 40 and the protocol control section 30.

As described above, according to the foregoing preferred embodiment, the virtual terminal control device 20 has the virtual terminal processing section 23 which performs the virtual terminal operation. Accordingly, even when the terminal 40 capable of controlling only one call via the protocol control section 30 is provided under the basic call control section 10 performing the connection control of a multi-call (call references are different) relative to the same terminal, the virtual terminal processing section 23 processes, on behalf of the terminal side, the call which is not processable at the terminal side. Thus, the basic call control section 10 for achieving the added service through a plurality of call references can be rendered common regardless of the call reference mode in the protocol control so that the same added service can be offered to the terminal of the single call reference mode.

In the foregoing preferred embodiment, the distributing section 21 of the virtual terminal control device 20 has a device to determine based on the protocol classification instruction from the exterior whether to cause the virtual terminal processing section 23 to process a portion of the primitive relative to the basic call control section 10, or whether to pass all of it through the actual terminal processing section 22. Thus, the protocol control section 30 and the basic call control section 10 can be connected via the virtual terminal control device regardless of the protocol classification processed by the protocol control section 30. On the other hand, it may be arranged that the distributing section 21 is fixedly instructed, in advance, of the single call mode protocol as the protocol classification, and a portion of the primitive is processed by the virtual terminal processing section 23. In this case, when the protocol control section 30 processes the protocol capable of controlling a plurality of call references, the protocol control section 30 and the basic call control section 10 are directly connected not through the virtual terminal control device 20. On the other hand, when the protocol control section 30 processes the protocol capable of controlling the single call reference, the protocol control section 30 and the basic call control section 10 are connected via the virtual terminal control device 20.

Further, according to the foregoing preferred embodiment, the call reference of each of the signals from the basic call control section 10 and the protocol control section 30 is converted to the internal number for facilitating the process in the virtual terminal control device 20, and the managing data 243 are managed using the internal number. On the other hand, the managing data may be directly managed using the call reference without conversion to the internal number. Even with this arrangement, the effect of the present invention is not affected.

The virtual terminal control device for the switching system according to the present invention includes the managing data. The managing data include call reference correspondence data indicative of a connectable correspondence between each of the call references of the basic call control section and each of the call references of the protocol control section, and terminal classification data for classifying each of the call references of the basic call control section into the actual terminal call reference corresponding to the call reference to the protocol control section and the virtual terminal call reference not corresponding to the call reference of the protocol control section. The distributing means determines whether the signal, as being the event of the call reference correspondence, from the basic call control section is connectable to the terminal via the protocol control section, and delivers the signal to the actual terminal processing means or the virtual terminal processing means. In response to receipt of the signals from the basic call control section, the protocol control section and the virtual terminal processing means, the actual terminal processing means determines and executes the operation per state while shifting the state, and transfers the signal to the protocol control section and the basic call control section, respectively, while converting the call reference of the signal. The virtual terminal processing means determines and executes the operation depending on the state of the actual terminal processing means relative to the signal from the basic call control section which can not be processed at the protocol control section, and sends the signal to the basic call control section and the actual terminal processing means so as to cause the basic call control section to judge as if the signal is directly sent from the actual terminal. Further, the call reference of the signal for connection to the terminal can be desirably changed by rewriting the call reference correspondence data and the terminal classification data. Accordingly, upon offering the added service which is used in the call processing section of the switching system having the hierarchical structure of the basic call control section and the protocol control section and is realized through a plurality of the call references, the added service control process in the basic call control section can be rendered common regardless to the terminal, that is, the call reference mode (single call reference mode/plural call reference mode), the protocol control section. Thus, even the unintelligent terminal capable of controlling only the single call can be offered with the intelligent added service.

What is claimed is:

1. A virtual terminal control device for a switching system, said virtual terminal control device provided between a protocol control section and a basic call control section, said protocol section performing a process control according to protocols where a number of simultaneously connectable call references differs depending on a terminal to be employed, said basic call control section performing a basic call connecting process relative to said terminal and further performing an added service control through a plurality of call references attendant upon said call connecting process, said protocol control section and said basic call control section forming a hierarchical structure and mutually sending and receiving signals each being an event of a call reference correspondence so as to achieve a call process in said switching system, said virtual terminal control device comprising:

- call reference managing data including terminal identifying data indicating that a plurality of the call references processed by said basic call control section and said protocol control section, respectively, are for said terminal, call reference correspondence data indicative of a connectable correspondence between each of the call references processed by said basic call control section and each of the call references processed by said protocol control section based on the number of the simultaneously connectable call references depending on a classification of the protocol processed by said protocol control section, and terminal classification data for classifying each of the call references of said basic call control section into an actual terminal call reference corresponding to the call reference of said protocol control section or into a virtual terminal call reference not corresponding thereto;

- distributing means responsive to a signal from said basic call control section for referring to said call reference managing data based on the call reference of the signal to classify the signal and to distribute the signal as one of said actual terminal call reference and said virtual terminal call reference;

- actual terminal processing means having means for determining and executing an operation per state while shifting the state in response to receipt of a signal, said actual terminal processing means, when detecting the signal of said actual terminal call reference from said basic call control section via said distributing means, looking up said call reference managing data so as to convert the call reference of the received signal into the corresponding call reference of said protocol control section and sending the corresponding call reference to said protocol control section, said actual terminal processing means, when receiving the signal from said protocol control section, looking up said call reference managing data so as to convert the call reference of the received signal into the corresponding call reference of said basic call control section and sending the corresponding call references to said basic call control section, said actual terminal processing means, when receiving a control signal inside said device, carrying out a designated process and a signal sending to said basic call control section, said actual terminal processing means, when detecting a changing trigger for said call reference correspondence data and said terminal classification data in said call reference managing data, changing said call reference correspondence data and said terminal classification data; and

- virtual terminal processing means for reading out a state of said actual terminal processing means in response to receipt of the signal of said virtual terminal call reference from said basic call control section via said distributing means, said virtual terminal processing means, depending on the received signal and the state of said actual terminal processing means, executing a process and a signal sending to said basic call control section and outputting said control signal designating an operation of said actual terminal processing means, said virtual terminal processing means, when detecting a changing trigger for said call reference correspondence data and said terminal classification data in said call reference managing data, changing said call reference correspondence data and said terminal classification data.

2. A virtual terminal control device for a switching system according to claim 1, further comprising means for converting each of said call references processed by said basic call control section and said protocol control section into an internal number for facilitating a process inside the device, and wherein internal number managing data are provided per said internal number as said call reference managing data, said internal number managing data including a normalized subscriber's number as terminal identifying data, distinction between said actual terminal processing means and said virtual terminal processing means as terminal classification data, a state of said actual terminal processing means in case of a terminal classification being said actual terminal processing means, an internal number where a terminal classification is said actual terminal processing means while said normalized subscriber's number being the same as that in case of the terminal classification being said virtual terminal processing means, a call reference, as the call reference correspondence data, for sending and receiving the signals relative to said protocol control section, and a call reference, as the call reference correspondence data, for sending and receiving the signals relative to said basic call control section;

- wherein every time said actual terminal processing means changes the state, said state is written in the corresponding internal number managing data; and

- wherein said virtual terminal processing means reads out the internal number of said actual terminal processing means from the corresponding own internal number managing data, and further reads out the state of said actual terminal processing means from said internal number managing data corresponding to said read-out internal number.

* * * * *